ELECTROCHEMICAL LOGIC ELEMENTS
Filed Jan. 10, 1964 4 Sheets-Sheet 1
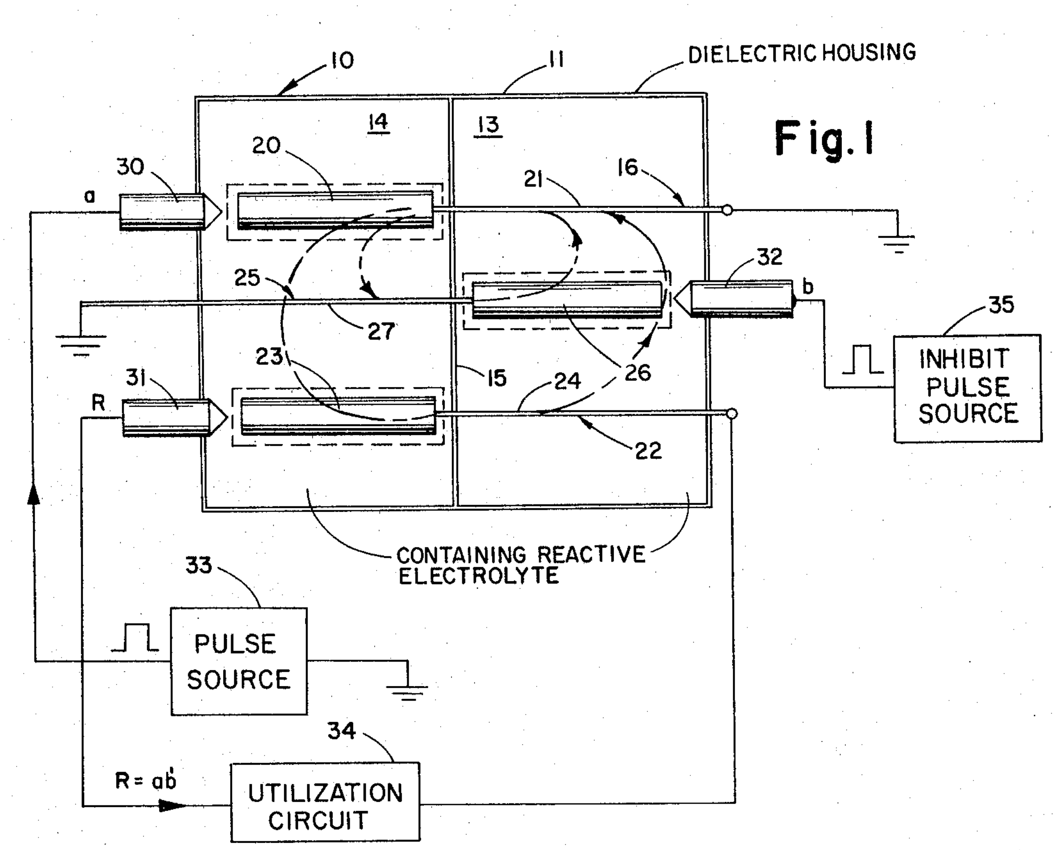
Fig. 1
Fig. 2
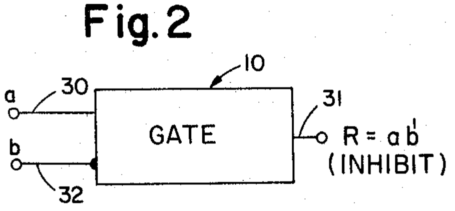
Fig. 3
TRUTH TABLE
| | ELECTRODE 30 | ELECTRODE 32 | ELECTRODE 31 |
|---|---|---|---|
| F1 | 0 | 0 | 0 |
| F2 | 1 | 0 | 1 |
| F3 | 1 | 1 | 0 |
| F4 | 0 | 1 | 0 |
INVENTOR.
ROBERT M. STEWART
BY John E. Wagner
ATTORNEY INVENTOR.
ROBERT M. STEWART
BY John E. Wagner
ATTORNEY

INVENTOR.
ROBERT M. STEWART

BY John E. Wagner
ATTORNEY

Dec. 27, 1966 R. M. STEWART 3,295,112

ELECTROCHEMICAL LOGIC ELEMENTS

Filed Jan. 10, 1964 4 Sheets-Sheet 4

INVENTOR.
ROBERT M. STEWART

BY John E. Wagner
ATTORNEY

United States Patent Office 3,295,112

Patented Dec. 27, 1966

3,295,112

ELECTROCHEMICAL LOGIC ELEMENTS

Robert M. Stewart, Encino, Calif., assignor to Space-General Corporation, El Monte, Calif., a corporation of California Filed Jan. 10, 1964, Ser. No. 337,079
35 Claims. (Cl. 340—173)

This invention relates to computers, and more particularly to electrochemical logic elements for use therein.

In my patent application Serial Number 74,526 filed December 8, 1960, now Patent No. 3,149,310, I disclosed an electrochemical computer memory employing a chamber enclosing a bonded mass of discrete conductive particles permeated with and surrounded by a fluid medium having the property of reacting with the exposed surfaces of the conductive elements to establish an unstable passivated surface film. A local disturbance of the passivated film produced by electrical, mechanical or chemical means will produce local excitation which is propagated along the exposed surface. The enclosed mass of conductive elements constitutes a lattice having almost an infinite number of discrete surface paths between opposite surfaces of the mass. By the selective application of electrical pulses to a large number of peripheral probes a disturbance of the unstable film condition can be produced which traverses the mass in any of numerous paths to a number of output probes similarly located at the periphery of the mass. Through a process of training, described in my above-identified patent application, the electrochemical memory can be conditioned to produce predetermined output for a particular combination of input electrodes to which a stimulus is applied.

The mechanism of signal propagation along the passivated surface, although not clearly understood, has been observed by researchers for many years. This phenomenon usually is demonstrated as the Lillie iron wire-nitric acid nerve model named after the experiments of R. S. Lillie described in Science Magazine, 1918 vol. 48, page 51, and other places. The conductor and electrolyte predominently used by Lillie, and others subsequently, are soft iron and about 70% (weight in aqueous solution) nitric acid.

Prior to my development of an electrochemical memory described in the above mentioned patent application, this phenomenon of signal propagation along the passivated surface had been used as a demonstration or simulation of the transmission of neural impulses through the human or animal peripheral nervous system. It is believed that the electrochemical computer memory disclosed in my previous patent application constitutes the first practical utilization of the classic Lillie experiment.

I have now developed, employing the same phenomenon, logic elements for use in computers. The logic elements employ an exceedingly simple basic structure, but in one simple form constitute a logically complete element in that by replication (together with a constant source of excitation) any logically determinate binary function may be produced. Some of these functions, as described by Boolean algebra are, for example: $R=ab$ (AND), $R=ab'$ (excite-inhibit), $R=a+b$ (OR), $R=a'$ (complement), $R={}^{m}(a,b,c)$ (majority), where R denotes the response of the output terminal to information pulses (or binary inputs) *a, b, c,* etc., and the prime notation means "not" or complement.

Moreover, I have produced a logic element which is truly adaptive in that it exhibits a "plasticity" of response functions which may, with use or with shock, be altered semipermanently to one or another of various possible functional "mutations." For example, the simplest (three-element) logically-complete cell ($R=ab'$) can, through slight plastic changes of internal structure, also behave according to two other functional mutations: $R=a$ and $R=o$.

The development of this electrochemical logic element employing the Lillie phenomenon results from the discovery that in addition to the transmission of pulses along the passivated excitable conductor it is possible, in accordance with my teaching, to both couple and inhibit the coupling of electrochemical pulses between a pair of electrode elements. I have further devised a structure (and modification of electrolyte) which provides control of the degree of coupling between the elements in a plastic or semipermanent way by the presence of an intermediate third element either active (subject to passivation and excitation) or merely conductive but electrochemically inactive or inexcitable. With this discovery I have devised a structure in which the excitation of an electrode may be accomplished; the coupling of pulses from the input electrode to a similar output electrode is obtained; and the means is provided for controlling the degree of coupling, in accordance with the logic function to be performed. It is of the utmost importance for future development of this art within the teaching of this invention, that the control is accomplished not by specific spatial access or structure but by temporal association as by gross shocks immediately following and coordinated with trial responses to trial stimulations.

It is a general object of this invention to provide an electrochemical logic element for computers.

Another object of this invention is to facilitate the design of complex computers through the use of composite assemblies of similar logic elements useful in performing any of a number of logic functions.

One further object of this invention is to provide a logically complete electrochemical computer logic element.

Additional objects of this invention include design of a computer logic element which is inexpensive and capable of manufacture by the assembly of a large number of similar elements and the subsequent adaption of the assembly to produce the required functions.

One further object of this invention is to provide an electrochemical logic element which is adaptive through a training process employing only gross peripheral access to the logic element through gross fields applied across the logic element. Such a functional characteristic is of prime importance as a way to produce computing, control or data-processing equipment of extremely small size.

These objects are all accomplished in accordance with this invention, one embodiment of which comprises a two-chambered housing, each chamber of which is filled with an electrolyte exhibiting the property of producing an unstable passivated film on exposed active or excitable material. Three conductive elements constitute the electrode of the device, two information input electrodes and one output. The electrodes are each made up of two portions, one active or excitable material which reacts with electrolyte, and the second electrically conductive but chemically inactive or inexcitable. The active portions of one input and the output electrodes are positioned in spaced parallel relation in one chamber and the inactive conductive portions extend into the second chamber. The second input or inhibit electrode is reversed with respect to the input and output electrode. Means are provided for coupling pulses from the output electrode.

Another embodiment of this invention, the electrolyte, in addition to having the property of reacting with the electrode material to provide passivation-excitation function, contains a solution of material capable of producing dendrite (treelike) growths on dentritic or acicular regions of the electrode elements which alter or adapt the response characteristics of the logic element.

One further embodiment of this invention involves a multielectrode logic element including a pair of broad area electrodes in addition to the excitatory, inhibitory and responsive electrodes. The broad area electrodes are designed to allow the application of an electric field across the information handling electrodes (which is correlated in time and direction with the relative "success" or "failure" of trial responses) and thereby to controllably vary the response of the logic element by promoting the growth of dendritic members on selective portions of the information handling electrodes.

Still another embodiment of this invention, an exclusive OR gate, includes a pair of oppositely disposed input electrodes in a dual-chambered enclosure with a single output electrode having a pair of oppositely disposed arms each coupled to a respective input electrode. The arms are oriented such that pulses applied to either input electrode alone are coupled to the output but the net exciting field is substantially zero in the presence of simultaneous input stimuli and no output occurs. Thus, exclusive OR gate operation is achieved.

One feature of this invention involves the combination of a pair of composite excitable-inexcitable electrodes immersed in a conductive reactive fluid medium, and a dielectric barrier effectively isolating the return conduction path through the fluid medium for each individual electrode wherein the fluid medium provides:

(1) Passivation of the electrode surface,
(2) Excitation in the presence of input stimuli, and
(3) Coupling of energy between electrodes.

Another feature of this invention is the above combination with a third element so arranged as to respond to an input pulse to inhibit the coupling of energy between the first two elements.

Still another feature of the invention resides in the fluid medium of such an assembly consisting of a reactive electrolyte component and metallic ion source for enabling both the transmission of pulses through the assembly and the altering of the response characteristics of the assembly as a function of dendritic electrodeposition of metal ions on the electrode structure.

One further feature of this invention resides in the combination composite excitable-inexcitable electrode structure, an ion containing reactive fluid and electrode means for impressing an electric field across the entire assembly for the purpose of producing fine structural changes to alter the function of the assembly.

Still another feature of this invention resides in the use of a number of similar composite excitable-inexcitable electrodes in combination with a reactive fluid to produce a variety of logical functions depending upon the positional relationship of the identical electrodes, and subsequently upon the conditioning or training of the logic assembly applied through field electrodes coordinated with the application of stimulus patterns to the assembly.

These and other features of this invention may be more clearly understood from the following detailed description and by reference to the drawing in which:

FIG. 1 is an enlarged longitudinal sectional view of one embodiment of a single logic element;

FIG. 2 is a schematic representation of the logic element of FIG. 1;

FIG. 3 is a truth table of the logic elements of FIGS. 1 and 2;

Figure 4:
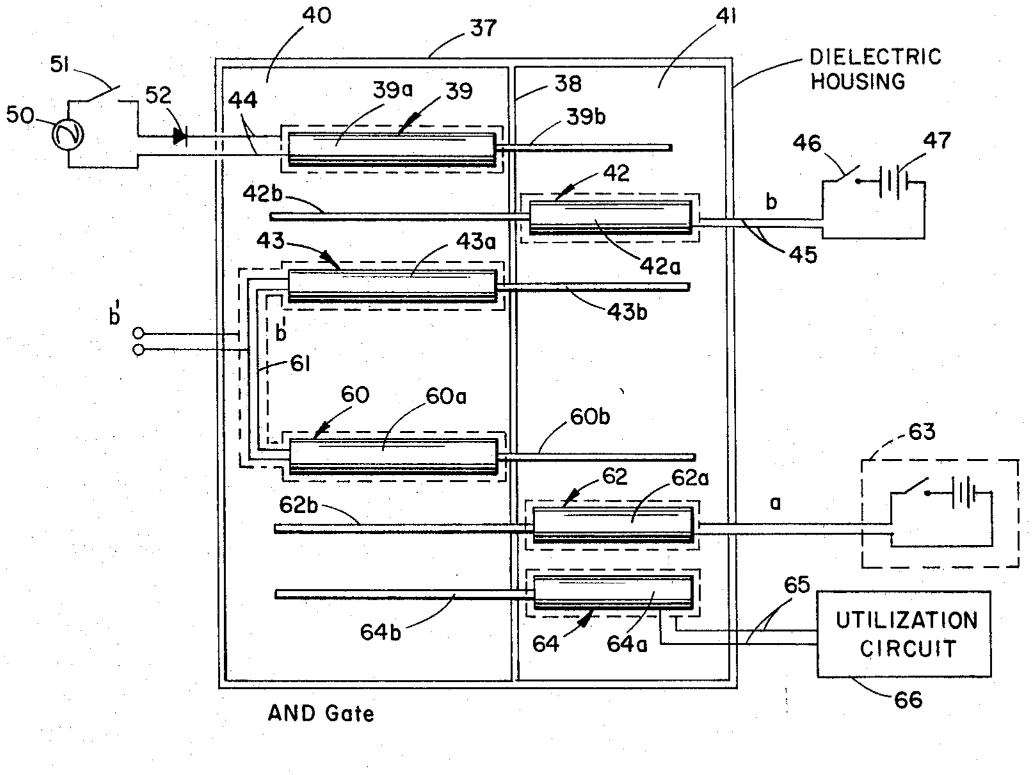
FIG. 4 is a longitudinal sectional view of a coincidence or AND gate based upon the logic element of FIG. 1.

Now, referring to FIG. 1, a logic element 10 in accordance with this invention comprises basically a two-chambered dielectric and non-reactive housing 11 containing in both chambers a reactive fluid, the electrolyte. The two chambers 13 and 14 are adjoining with a thin dielectric membrane 15 as a common wall. Extending into the housing 11, completely through chamber 13 and into chamber 14, is a first operating electrode or dipole 16 including a portion 20 of excitable material totally within chamber 13 and a lead portion 21 of electrically conductive but inexcitable material secured to the active portion 20 and extending from chamber 13, completely through chamber 14 and to the exterior of the housing 11. A second operating electrode or dipole 22 made up of an excitable portion 23 and a conductive inexcitable lead portion 24 extends in spaced parallel relationship with electrode 16. The two excitable portions 20 and 23 are enclosed in chamber 13 and the conductive inexcitable portions extend side-by-side through chamber 14 and to the exterior. The electrode 22 is the normal output electrode of the logic element 10 and through the coupling mechanism, hereinafter described, responds to electrical impulses applied to the input electrode 16.

A third or inhibit electrode 25 is structurally identical to electrodes 16 and 22 but oppositely positioned within the housing 11. An excitable portion 26 is enclosed within chamber 14 and the inactive portion 27 in electrical contact with the active portion 26 extends from chamber 14 through the membrane 15, chamber 13, to the exterior of the housing 11. In addition to these three operating electrodes, 16, 22 and 25, of the logic element 10, firing electrodes or probes 30, 31 and 32 extend into the housing 11 each with a point adjacent to the excitable portions of respective electrodes 16, 22 and 25. The firing pins 30, 31 and 32 are simply electrically conductive inexcitable members of, for example, aluminum or platinum which serve to couple information pulses to or from an extremity of the adjacent excitable electrode. The externally extending lead portions 21, 24 and 27 constitute the grounding connections for the operative electrodes 16, 22 and 25. Other coupling structures are possible and will be described later.

The firing pin 30 is connected to a pulse source 33 capable of supplying input information pulses of about 0.2 milliampere-second per square centimeter of area of excitable material 20. The pin 31 positioned to couple pulses from electrode 22 is connected to a utilization circuit 34 responding to the presence or absence of an information pulse on the excitable portion 23 of electrode 22. The utilization circuit may be the output stage of a computer incorporating this electrochemical logic element or may be a similar element connected in tandem to be operated directly from the output of the logic element 10. The pin 32 positioned in spaced juxtaposition to the excitable portion 26 of electrode 25 is connected to an inhibit pulse source 35 which may be an external signal source or, similar to the utilization circuit 34, may be a logic element like the element 10.

In the above description the operating electrodes of the logic element 10 are described as composite assemblies of excitable and inexcitable portions immersed in an electrolyte. The term excitable is used to denote the property of a material to develop on immersion in a fluid termed the electrolyte, a passivated or chemically inactive but marginally unstable surface film which prevents violent chemical reaction between the electrolyte and the base material and constitutes a poor conductor of electrical current between the electrolyte and the interior of the body of excitable material. When disrupted, it is important that spontaneous recovery take place shortly thereafter. The instability of the passivated film is of critical importance since the transmission of pulses is accomplished by the local disturbance of the passivated film producing a localized active region which spreads out or travels the length of the excitable material. The term inexcitable denotes a material which is electrically conductive but chemically non-reactive with the electrolyte.

A preferred electrode-electrolyte system for the device of FIG. 1 is one employing soft iron (99+ percent pure) for the excitable material; gold wire for the conductive-inexcitable material; and, nitric acid (50–70% concentrated) as the electrolyte. The chemical reaction between the nitric acid and soft iron produces an invisible passivated oxide film on the order of 50 angstrom units in thickness which terminates the oxidization reaction. The film may be easily disturbed by:

(1) The application of an electric field, for example by a positive voltage applied to the pin 30;

(2) By touching with zinc;

(3) By mechanical disruption of the film as may be produced by contact with a probe; and (4) By chemical means, to locally reduce the concentration of the nitric acid below the lower stable operating limit of about 50%. The inexcitable portion of the electrodes 16, 25 and 22 in an iron-nitric acid system is preferably a noble metal such as silver, gold or platinum, or may be aluminum. The noble metals exhibit both high conductivity and resistance to attack by the nitric acid electrolyte and further form an internal battery with the iron and electrolyte. The internal or submerged battery made up of the excitable portion 20, the lead portion 21 in chamber 14 with the electrolyte in that chamber, constitutes a short-circuited battery providing a bias current tending (for noble metals) to stabilize the passivated film to the extent that it is not disrupted by non-signal disturbances. The comparable portions of electrodes 25 and 22 similarly serve the same purpose of sustaining the passivated films on the respective excitable portions 26 and 23.

The logic element 10 of FIG. 1 may be simply represented as an inhibit gate as shown in FIG. 2. The firing pin terminal 30 is identified as the *a* information input and the firing pin terminal 31 as the respondor terminal R or the gate. The terminal pin 32 constituting the inhibit input provides the *b* input to the gate. The function $R=ab'$ is produced by the gate of FIG. 2 and the logic element of FIG. 1. The complete functional relationship of the logic element 10 is illustrated in the truth table of FIG. 3.

The first response F1, although considered obvious, is significant. It denotes the lack of an input pulse at either terminal pins 30 or 32 (represented by 0's) producing no output pulse (O) at terminal 31. This function is included because the logic element depends upon an unstable equilibrium condition in the electrochemical cell and one in which the spontaneous disturbance of the passivation equilibrium condition would produce a spurious response. Insensitivity to the spontaneous generation of spurious responses is essential to successful operation as a computer element. As is described above, the internal battery effect of the cell tends to facilitate the natural formation and maintenance of the passivated film and therefore further insures that the response F1 is successfully obtained.

In the second response F2, the presence of a pulse at electrode 30 with no pulse at electrode 32 produces a response at electrode 31. The bilateral or symmetrical operation of the device also illustrated by F2 wherein a trigger pulse applied to the terminal 31 in the absence of a pulse at terminal 32 results in a response at terminal 30. The inhibit operation is represented in the relationship F3. Whenever a pulse appears simultaneously on probes 30 and 32, no response is obtained at the terminal 31.

The fourth response, illustrated as F4 in the truth table, is also necessary for successful inhibit operation in that an input pulse applied to the inhibit terminal 32 does not produce a response at either terminal 30 or 31.

When the system of FIG. 1 is not subject to stimulation, there are circulating currents passing through all dipoles. The direction and magnitude of these currents depend primarily upon the choice of materials. For example, when in FIG. 1 the inexcitable portions 21 and 27 of electrodes 16 and 25 are noble metals (gold, silver, platinum) or graphite the current at the surface of all excitable elements is outwardly directed from the interior of the excitable material into the electrolyte thus tending to stabilize the passivated films. Some other inexcitable materials (such as aluminum) result in oppositely directed currents which tend to increase the sensitivity of the cell, i.e. reduce the threshold of excitation. Thus a measure of control over the sensitivity of the excitable surfaces may be obtained through the choice of inexcitable material.

The most important phenomenon significant in the operation of the logic cell of FIG. 1 involves the presence of the inexcitable conductive material which allows strong coupling of energy from one separated operating electrode to a second and hence makes both excitation and inhibition possible.

Each of these phenomenon are directly involved in the successful operation of the logic element 10 which operates as follows: In the normal quiescent state, the electrolyte reacting with the surface of the excitable material develops the unstable passivated film (represented by a dashed line in the drawing) on the surface of the excitable portions 20, 26 and 23 of the electrodes of logic element FIG. 10.

Upon the application of a positive potential to the firing pin 30, the field localized at the end of the excitable portion 20 of operating electrode 16 causes the normally passivated film covering the electrode to be temporarily disrupted, producing a local zone of chemical activity as the nitric acid attacks the barrier iron. The active area spreads over the entire surface of the excitable portion 20 (by a "Lillie-wave") with electron flow through the body of the iron (and surface charge transfer to electrolyte) ahead of the wave resulting in disruption of the oxide surface immediately adjacent to the active portion while the region immediately behind the active portion is rapidly reoxidized by the nitric acid electrolyte.

During and after the reoxidation of the iron, the latter region becomes insensitive to reexcitation for a period of time termed the refractory period. The excitation is believed to be accomplished by the current which electrochemically reduces the ferric iron oxide to ferrous iron, thereupon dissolving in electrolyte very rapidly. This is accomplished only when current flows from the electrolyte through the iron oxide into the iron (using the positive convention).

Following the positive or ion flow convention, the current flow loops in the single electrode 16 in the absence of the dielectric membrane 15 would be from the excitable material 20 outward, disrupting the oxide layer, through the electrolyte and into the conductive inexcitable material 21, and thence back across metal-to-metal contact through the core of the electrode dipole. The presence of the dielectric wall 15 restricts the main current return path to a path through the other conductors in the region, namely the electrodes 22 and 25. In the case of the electrode 25, used for inhibit purpose, return current flowing through conductive portion 27 tends to stabilize the passivated surface on the excitable portion 26 rather than excite it. The passivated oxide layer is not disrupted by current tending to flow from the interior of the iron to the exterior. The excitable portion 23 of electrode 22 exhibits the same property as the excitable portion 20 of electrode 16 of being excited by a field across the membrane 15 in such a direction to induce current flow from chamber 14 to chamber 13.

Excitation of electrode 22 produces a wave propagated over the excitable portion 23 and providing a current return path therethrough. The current paths are affected upon an excitory stimulus represented by the dash-dot lines of FIG. 1. The conductive inexcitable portion 24, of course, provides a low resistance portion of low return path as does the interior of the iron. Therefore, excitatory coupling is readily achieved between the electrodes 16 and 22 (in the absence of any externally produced activity in electrode 25).

Direction of current flow through the cell 10 upon excitation of electrode 20 is shown as dash-dot lines. It is apparent that the current through electrode 23 is in a direction tending to disrupt this passivated film and therefore, if sufficiently large and persistent, produces a detectable sudden change in surface potential.

The operation described responding to a triggering pulse from the pin 30 is not regenerative between the two operating electrodes 16 and 22 after the termination of propagation of the wave along the excitable portion 20. Therefore, the logic element responds on a pulse-per-pulse basis.

If simultaneously with the arrival of a triggering pulse on pin 30, a similar pulse from the inhibit pulse source 35 is applied to the pin 32 both active portions 20 and 26 of electrodes 16 and 25 respectively are simultaneously excited and the oxide coating thereon disrupted, aiding current flow from the active portion 26 outward into the electrolyte coupling through the inexcitable portion 21 and the excitable iron portion 20, through the active surface region thereof and return through the electrolyte in chamber 14 to the portion 27 of electrode 25. After firing, both electrodes include low resistance surface areas on the excitable material thereby constituting virtually a pair of oppositely poled batteries short-circuited together similar to the D.C. stabilizing effect. The net electric field between the chambers 13 and 14 is very small since the fields generated by the two electrodes 16 and 25 tend to cancel.

If a pulse is applied to the inhibit electrode 25 via pin 32 with no input pulse applied to pin 30, the excitation of electrode 25 occurs. Current tends to flow outward from the excitable portion 26 through the electrolyte and both inexcitable portions 21 and 24 of the electrodes 16 and 22. This direction of current flow produces no excitation of portions 20 and 23. Therefore, a pulse applied from the inhibit source produces no output on either the pins 30 or 31. Complete inhibit operation is therefore achieved.

The configuration and arrangement of electrodes in the inhibit gate of FIG. 1 can be replicated to produce any logical function, e.g. a coincidence or AND gate as shown in FIG. 4. In this embodiment two identical three-electrode assemblies isolated by spacing or a partial barrier are enclosed in a single two-chambered housing 37 having a dielectric membrane 38 identical in function to the membrane 15 of FIG. 1. A first electrode assembly includes an operating electrode 39 having an excitable portion **39*a* in a chamber 40 and an inexcitable portion 39*b* extending through membrane 38 into chamber 41. Both chambers 40 and 41 are filled with an electrolyte. A second electrode 42 is oppositely disposed within the housing 37 with an excitable portion 42*a* in chamber 41 and an inexcitable portion 42*b* in a chamber 40. The output electrode 43 of the assembly is disposed similar to electrode 39**.

The information input connections to the electrodes 39 and 42 include respective probes 44 and 45 extending into the housing 37 and spaced from the excitable portions **39*a* and 42*a* in position to apply triggering pulses thereto. The information input to electrode 42 is, similar to FIG. 1, represented by a switch 46 and a battery 47 poled to apply a positive potential to the electrolyte in the region of the film on electrode 42*a***. This information source provides a *b* input to the logic element of FIG. 2.

The electrode 39 is under the influence of a source of constant excitation capable of supplying periodic or repetitive positive pulses to the probe 44 at intervals comparable to (but longer than) the refractory period of the electrode 39, e.g. one millisecond to one second depending primarily upon temperature and electrolyte concentration. The source of constant excitation is represented by a generator 50, a switch 51, and diode rectifier 52, series connected to the probe 41 to apply positive potential to the electrolyte adjacent to the passivated film on the excitable electrode **39*a***. Preferably, switches should be synchronized.

The output electrode 43 of the first electrode assembly, by way of contrast from the logic element 10 of FIG. 1, is conductively connected to an input operating electrode 60 of the second electrode assembly by an elongated excitable conductor 61, for example an iron wire also having a spontaneously formed passivated oxide layer throughout its length in its resting state. The wire 61 conducts information pulses from the first to the second electrode assembly by the propagation of an active region in the same manner as occurs on the surface of the excitable electrode portions **39*a*, 42*a* and 43*a*. The active region is then propagated along the active electrode 60 in the same manner as occurs by external triggering. An additional information input source 63** to the logic cell, similar to the *b* input signal source, is arranged to trigger an electrode 62. The output electrode 64 of the cell is arranged parallel to electrode 62 with an inexcitable portion **64*b*** positioned for ready coupling of current from the *a* input electrode 62. A pair of probes 65 are positioned adjacent to the excitable portion **64*a* of the output electrode 64 and connected to the utilization circuit 66** for the AND gate.

The operation of the AND gate of FIG. 4 may be readily understood in terms of Boolean notation and keeping in mind the operation of the inhibit gate of FIGS. 1 and 2. The operative assembly, including electrodes 32, 35 and 36, constitutes an inhibit gate similar to that of FIG. 1. Its Boolean equation, therefore, is $R=xy'$ where R denotes the response (binary) and $x$ and $y$ the two information inputs (binary), the prime notation denoting complementation. In this case a source of constant stimulus (denoted as 1) is substituted for the $x$ input and $b$ for the $y$ input. The equation then becomes $R=1b'$ or $R=b'$, i.e. electrode 36 is triggered whenever there is an absence of an input signal $b$, but is quiet when $b=1$.

In the second three-electrode assembly of the gate, the same response function applies: $R=xy'$ with the $a$ input from source 66 constituting the $x$ function and the $b'$ signal from the electrode 43 the $y$ function. The response equation then becomes $R=a(b')'$ or $R=ab$, i.e. coincidence operation.

Although the structure of FIG. 4 is recognized as involving a rather large number of electrodes and stimulus sources, it serves to illustrate the universality of the basic logic element of FIG. 1, i.e. how a number of similar groups of electrodes can produce all different possible logic functions by variations in their relative positioning in the electrolytic medium and by providing some points of constant excitation or stimulation.

Figure 5:
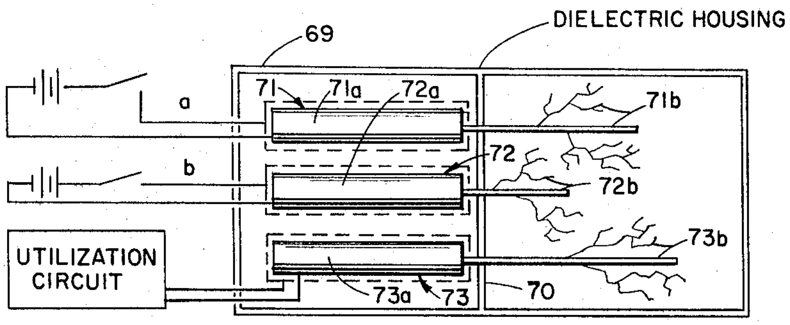
FIG. 5 is a plan view of an "OR" gate employing principles of this invention.

The coincidence or AND function may be more easily accomplished in a single three-element device in which all elements are parallel. Such a device is of less fundamental importance though since it is not logically complete. Such an arrangement is shown in FIG. 5. It comprises a housing 69, membrane 70 and electrolyte similar to the previously described embodiments. Two input electrodes 71 and 72 and a single output electrode 73 are arranged in aligned parallel relationship with the excitable portions **71*a*, 72*a* and 73*a* all on a common side of the membrane 70 with inexcitable portions 71*b*, 72*b* and 73*b* in the opposite chamber. Coincident operation can be accomplished where the inexcitable portions 71b and 72b of input electrodes 71 and 72 are of such dimensions that the coupling capacity, i.e. the size of the tail or dendrite, of either portion singly is insufficient to trigger the output electrode 73. Normally, this is accomplished by providing inexcitable portions 71b and 72b of somewhat shorter length or smaller surface area than the inexcitable portion 73b of electrode 73. The adjustment of the threshold of operation may be achieved by cut and try methods to determine the necessary length of inexcitable portions 71b and 72b to produce triggering of the output electrode 73 on coincident excitation of electrodes 71 and 72 without responding to a stimulus applied to a single input electrode. It should be recognized that the identical structure of FIG. 5 can produce, in addition to the coincidence function $R=ab$, four other functions given control over the size and coupling capability of the inexcitable portions 71b and 72b. Where neither are of sufficient size to provide effective coupling the unit responds $R=o$. Where either electrode 71 or 72 will upon stimulation excite electrode 73** the logic element produces $R=a+b(OR)$. Where one only of the electrodes has effective coupling the logic element produces a straight through connection: $R=a$ or $R=b$. All of these functions are produced by varying only one parameter of the element, the size of the dipole inexcitable members.

As another example, an exclusive OR gate may be produced in accordance with the principles of this invention.

Figure 6:
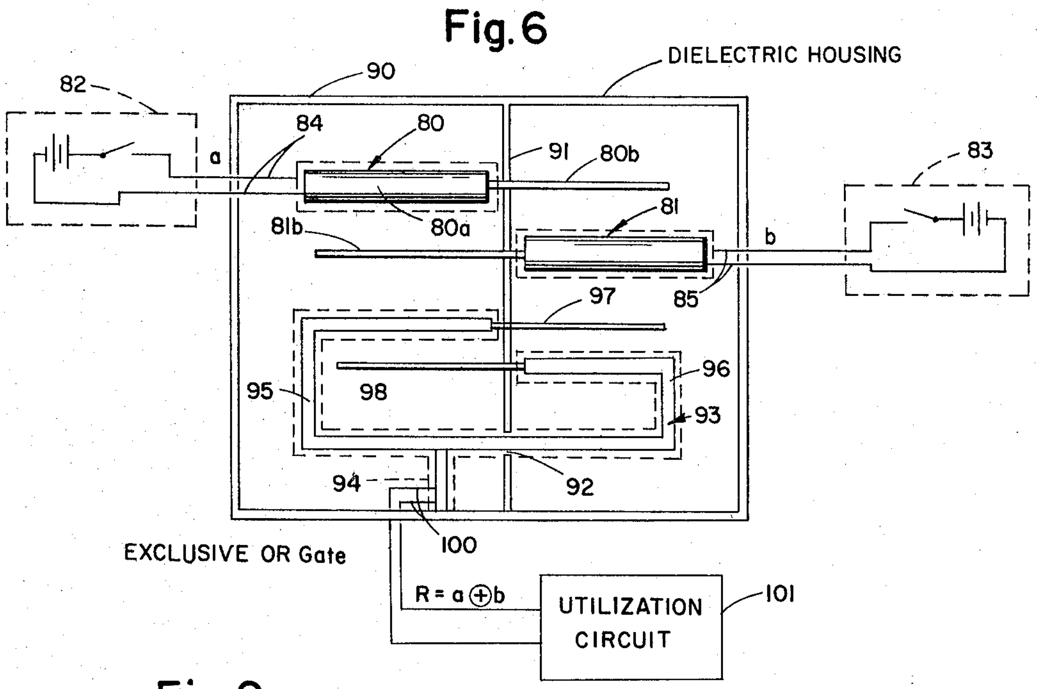
FIG. 6 is an exclusive "OR" gate employing the principles of the invention.

One example of an exclusive OR gate is shown in FIG. 6 including a pair of oppositely disposed operating electrodes 80 and 81 each having a respective input signal source 82 and 83 and triggering probes 84 and 85 all within a housing 90 with a membrane or poorly conducting barrier 91 which effectively isolates the inexcitable coupling portions 80b and 81b from each other while including a restricted opening 92 through which propagated pulses on an output electrode 93 may travel. The output electrode 93 comprises a length 94 of excitable material, e.g. soft iron, having a pair of arm portions 95 and 96 extending into the chambers defined by the membrane 91. Each arm 95 and 96 terminates in a respective inexcitable portions 97 and 98 extending in opposite directions through the membrane 91. With this arrangement the inexcitable portion 97 is positioned to couple current from the inexcitable portion 80b of electrode 80 while the inexcitable terminating portion 98 of the output electrode is coupled to portion 81b of input electrode 81, employing the same mechanism described heretofore. The arm 95 and its inexcitable termination 97 are insensitive to coupling of energy from the electrode 81 because of opposite orientation. The same is true with respect to arm 96, its coupling portion 98, and electrode 80.

Whenever an input pulse is applied to the probe 84 alone, thereby exciting electrode 80, energy is coupled through portion 80b and termination 97, exciting arm 95, and is propagated over length 94 to be detected by an output probe 100 connected to a utilization circuit 101. Whenever the electrode 81 is triggered by source 83 and electrode 80 is quiescent, energy is coupled via portion 81b to termination 98 and an output pulse propagated through arm 96 and length 94 to be detected by probe 100 and conveyed to utilization circuit 101.

If both input signal sources 82 and 83 are simultaneously operative, both electrodes 80 and 81 are excited providing net field of zero across the membrane and an inhibiting short-circuit path similar to the inhibiting action in the embodiment of FIG. 1 and no output pulse occurs. Therefore, the cell of FIG. 6 responds to either input $a$ or $b$ but not to simultaneous inputs, i.e. exclusive OR operation represented by the equation $R=a\oplus b$.

In each of the embodiments described above, the function of the particular logic element is determined first by the positional arrangement of similar electrodes (FIGS. 1, 3, 4 and 6) and the configuration or size of electrodes (FIG. 5), and are not subject to control or change without actual structural modification of the logic element.

I have discovered that the logic elements of this invention are readily suited to become truly adaptive elements. This is accomplished by the addition to the electrolyte contained within the chamber of a solution capable of supplying metallic ions to produce metallic dendrite growths on the electrodes in response to a controlled applied field.

Figure 7:
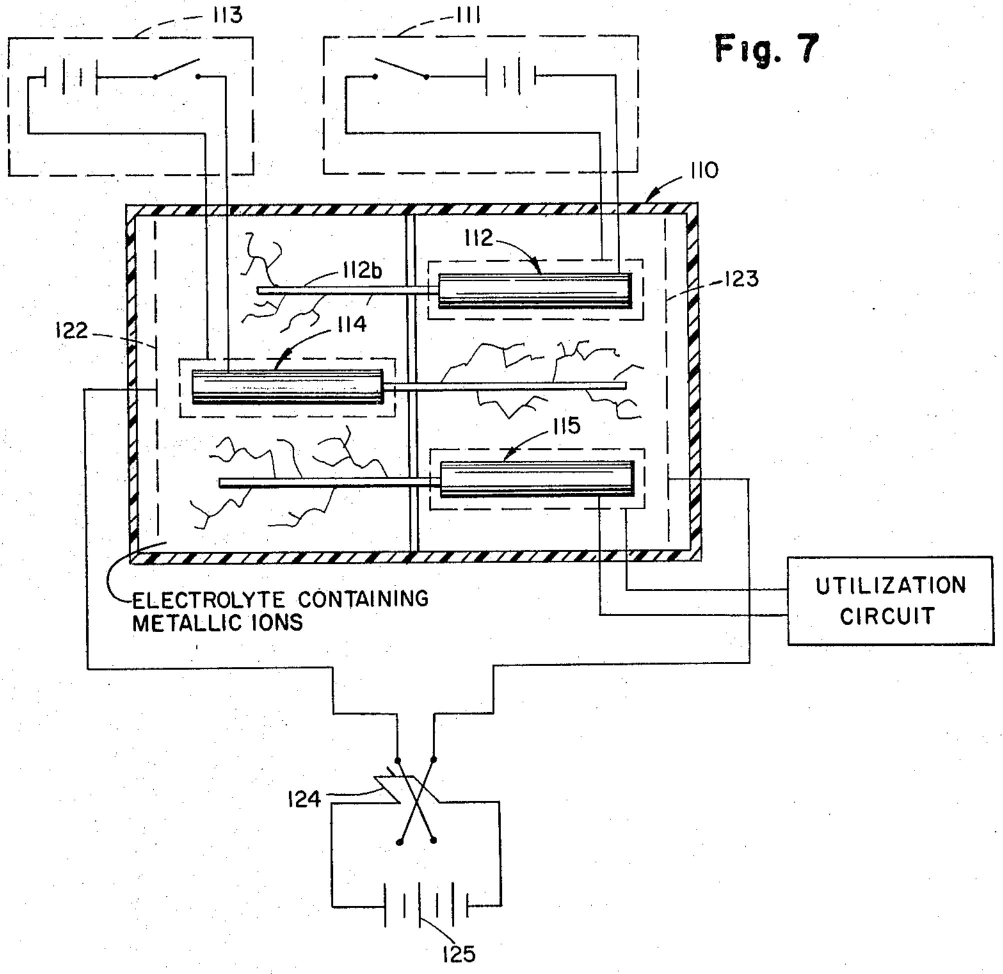
FIG. 7 is a longitudinal sectional view of an adaptive logic element.

A minimal structure capable of adaptive operation, based upon the logically complete cell of FIG. 1, is shown in FIG. 7. The adaptive logic element 110, similar to element 10 of FIG. 1, includes an input signal source 111 and an input operating electrode 114 and an output electrode 115 and associated probes 116 and utilization circuit 120.

The two-chambered housing 121 also includes a pair of field electrodes in the form of plates 122 and 123 positioned to apply a voltage across the entire cell when a reversing switch 124 controlling a battery 125 is closed.

The electrolyte within the cell chambers is a composite fluid capable of:

(1) producing the passivation-excitation effect with the excitable portions 112a, 114a and 115a of the operating electrodes; and (2) significantly changing the surface area (and, hence, conductance) of the inexcitable conductive portions 112b, 114b and 115b of the same electrodes by electrodeposition of inexcitable metal.

Typically, but not exclusively, the fluid medium comprises, approximately:

54% nitric acid;
0.1% gold chloride; and
46% water, for use with gold coupling portions of the electrodes.

The adaptive operation of the cell 110 results from the phenomenon that the membrane or film resistance of the excitable electrode portions 112a, 114a and 115a drops dramatically when the electrode is triggered and the reduction in membrane resistance continues for a significant period after pulse propagation. The result is that the conductance of the recently fired excitable portion is greater than or approximately equal to the conductance of the inexcitable (gold) portion which in turn is very much greater than the conductance of the passive excitable electrode portions. This may be expressed as $$C^*_{Fe'} \gtrsim C_{Au} >> C_{Fe}$$

in which $C^*_{Fe'}$ is the conductance of a recently fired iron electrode, $C_{Au}$ is the conductance of its associated inexcitable portion (gold) and $C_{Fe}$ is the conductance of a passive iron electrode.

If a positive E.M.F. E is applied by the battery 125 to electrode 123 with respect to electrode 122 shortly after either of the electrodes 112 or 114 has fired, the current through an unfired electrode (if any) will be negligible compared to that through a recently fired electrode. The magnitude of the current through any recently fired electrode is effectively a direct function of the conductance of the inexcitable portion $C_{Au}$. The flow of current from the external source through the electrolyte and into the inexcitable portion thence through the excitable portion of a recently fired electrode results in the growth of minute dendritic whiskers on the inexcitable portion of 114 thereby increasing its conductance, and increasing the coupling to similarly oriented electrodes, and diminishing dendrites on 112. If the E.M.F. were reversed across the cell, allowing current to flow in the reverse direction, these effects would be reversed. The effect of applied fields on recently excited electrodes of opposite orientation in thus opposite. Therefore, a field promoting dendrite growth on recently fired excitor electrodes causes a depletion of similar growths on recently fired inhibitors and visa versa. Since it is possible to change the coupling of electrodes by the selective application of an electric field across the cell, it is possible to change the response by exciting the selected electrode and immediately thereafter applying a conditioning field.

Moreover, the signal response currents which flow through an electrode with use are in the direction tending to promote dendrite growth on the fired electrode, thereby always increasing conductance (and, hence, coupling strength) with use.

Carried to the ultimate, the simple three-terminal cell 110, capable originally of producing the response $R=ab'$ will, through training, i.e. application of an E.M.F., and/or use, vary the weight of the *a* and *b* influences and ultimately, with proper training, also produce the functions $R=a$ or $R=o$ depending upon whether the growth of dendrites on the *a* input electrode 112 or the *b* inhibit electrode 114 is produced. In FIG. 7 a dendrite tree is indicated on electrode **112*b* by dotted lines as it might appear after repeated applications of positive potential to field electrode 122 following excitation of electrode 112**. In general, such a three-terminal element which originally provides a response $R=o$ or $R=a$ or $R=ab'$ can be trained to produce either of the other two functions.

In each of the embodiments described above the electrodes are all illustrated as regular geometric forms equal in size, and the barriers as virtually continuous dielectric membranes. These forms were used to facilitate understanding of the invention but by no means are required. Illustrative of the point is the simple two-electrode element of FIG. 8. It comprises a closed housing 130 containing a reactive electrolyte containing metallic ions and having a pair of field electrodes 131 and 132 on opposite sides of the chamber formed by the housing 130. A pair of electrodes 133 and 134, are each made up of irregular masses of excitable material **133*a* and 134*a* and inexcitable (dendrite) portions 133*b* and 134*b* of varying length and direction. A pair of triggering probes 135 are positioned to stimulate electrode 133 and a similar pair of probes 136 are positioned to detect the excitation of electrode 134. The electrodes 133 and 134 are supported within the housing 130** by a closely packed array of dielectric bodies, for example glass balls providing not only physical support for the electrodes but reducing the bulk conductivity throughout the medium within the housing and, hence, increasing impredance to "short-circuit" or self-circulating return currents.

Previous attempts to obtain strong coupling between isolated conductors have been unsuccessful or at best erratic. Experimental results and theory of such isolated conductors without any dielectric barrier in the electrolyte support the conclusion that coupling becomes less probable as the sizes of the active conductors are reduced. By way of contrast the studies of FIG. 1, for example, includes dipoles of total length of 1 to 2 centimeters and 1 to 3 millimeters in diameter. Owing to the presence of the dielectric barrier, the behavior of the cell is not size dependent. This conclusion is supported by theoretical analysis, and reductions in size in the order of 100 or 1000 times are entirely practical.

The effect of the dielectric bodies provides a degree of conductive isolation between the inexcitable and excitable portions of the electrodes 133 and 134 similar to the dielectric membrane of the previous embodiments. The bulk conductivity can be controlled by choice of sizes and mixture of sizes of dielectric bodies. The dendrite structures **133*b* and 134*b***, constituting the inexcitable portions of the operating electrodes, are normally produced in situ through the training process and therefore extend through the interstices between the dielectric bodies as illustrated in FIG. 8.

Figure 8:
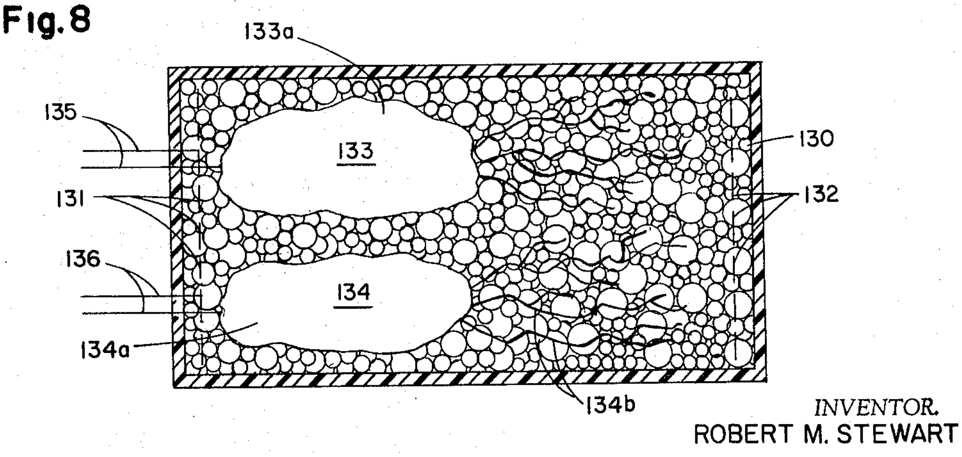
FIG. 8 is a longitudinal sectional view of a simple two-element electrode adaptive logic element.

After training, resulting in dendritic growth of the magnitude shown, the logic element of FIG. 8 is equivalent to the combination including electrodes 112 and 115 of FIG. 7. In operation, trigger pulses applied to probe 135 are detected on probe 136 when sufficient coupling through the dendrite growth exists. The coupling may be increased by the application of a positive potential to field electrode 132 with respect to electrode 131 immediately after exciting or firing dipole 133, or decreased by a reversed field which tends to deplete the dendrite growth on the recently fired dipoles.

Although the conditioning or training of a two or three-terminal cell to produce the functions $R=a$ or $R=o$, or $R=ab'$ (this latter in the three-terminal device) may be of significance, the real importance of the concept of gross field adaptation resides in more complex but similar logic cells containing a large number of "input" dipoles and one or more respondor or output dipoles in which a myriad of responses can be obtained and varied at will through the process of conditioning or training to produce desired functions through the cooperative or coordinated action of a single pair of virtually unstructured field electrodes following a sequence of trial stimulation patterns.

Figure 9:
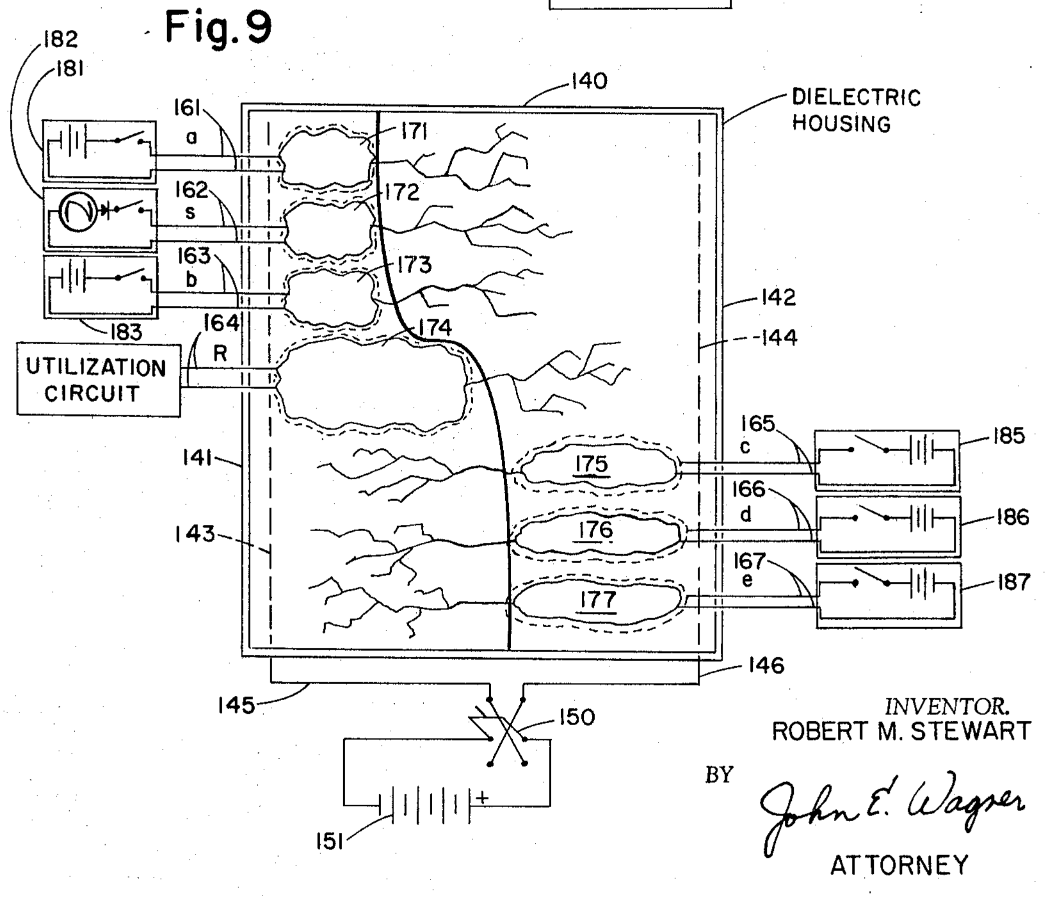
FIG. 9 is a longitudinal sectional view of a composite adaptive linear decision function assembly.

A structure capable of providing a large number of useful logic functions after manufacture and training is shown in FIG. 9. It comprises a dielectric housing 140 having a pair of end walls 141 and 142 through which a number of electrical terminals extend. Enclosed within the housing 140 adjacent to the planar end walls 141 and 142 are a pair of field electrodes 143 and 144 connected via leads 145 and 146, respectively, and a reversing switch 150, to a direct current source 151. The terminal plates 143 and 144 are arranged so that an electric field may be established parallel to the axis of the cylindrical housing 140 upon closure of the switch 150. The reversing switch allows the selective reversal of polarity of the field plates 143 and 144.

As shown in FIG. 9, double probes 161, 162, 163 and 164 extend into the housing 130 through the planar end wall 141 through openings in the field electrode 143 into the central region of the housing 140. A number of similar double probes 165, 166 and 167 extend through the end wall 142 through openings in the field plate 134 and into the central region of the housing 140. The probes 161–164 are each operatively associated with a respective dipole 171–174 shown as irregular masses of excitable material with dendritic growths extending generally in the direction of field plate 144. The dipole 174, somewhat larger in size, is termed the responsor while dipoles 171–173 constitute excitor electrodes. The probes 161 and 163 are each connected to individual trigger pulse sources 181 and 183 while proble 162 is connected to a source of constant stimulus 182. Probes 164 associated with the responsor electrode 174, upon which the response of the logic cell appears, is connected to the utilization circuit 174 for the logic element. A number of inhibitor electrodes 175, 176 and 177 oppositely disposed in the housing 140 are similarly made up of an excitable mass and inexcitable dendritic growths. The electrodes 175–177 are each positioned to be excited by the triggering pulses applied to respective probes 165–167 from pulse sources 185–187.

A poorly conducting barrier between the excitable and inexcitable portions of each electrode is represented by membrane 180 although it should be recognized that the same effect is achieved with particulate dielectric filler of the type illustrated in FIG. 8. The entire housing 140 is filled with a composite electrolyte of the type described in connection with FIG. 7, to wit a reactive fluid such as nitric acid (50–70% concentration) and a metallic ion producing component such as gold chloride.

Over and above the capability of responding to a single excitor and inhibitor as in the previous embodiments, the logic element of FIG. 9 can be shown to have an excitatory current $I_R$ to the firing of a number of excitors $$I_R \approx -e \frac{\sum_{i=1}^{n} (\pm)(1,0)[C_d]_i}{\left[1+\frac{\sum_{i=1}^{n}(1,0)[C_d]_i}{C_{R_p}}\right]} \quad (1)$$

where ($\pm$) indicates whether a given input is excitatory (+) or inhibitory (−) and (1,0) indicates whether (1) or not (0) a given input (either excitatory or inhibitory) has been recently active, $C_D$ is the dendrite conductance and $C_{R_p}$ is responsor conductance when passive, and $n$ is the total number of inputs, where a positive current is taken (for all elements) flowing from right to left through the barrier 80. Thus a negative value of $I_R$ will tend to elicit a response (current into the surface of the excitable mass).

The expression for $I_R$ gives the current through the "output" or responsor 174 which fires when the integral of this current coupled through the electrolyte from the excited input electrodes exceeds a response threshold. The current is a non-linear function of the various dendrite conductances. The non-linearity is slight, however, if either $$C_R \gg \Sigma(1,0)[C_d]_i \quad (2)$$

or $$\frac{\Sigma(1,0)[C_d]_i}{C_R} \text{ a constant} \quad (3)$$

either condition reasonably occurring. Then $I_R$ is proportional to $$\sum_{i=1}^{n}(\pm)(1,0)[C_d]_i \quad (4)$$

which is a simple linear weighted sum of excitory and inhibitory inputs which therefore gives a linear decision function for the response.

A mechanism for conductance change exists in the logic element of FIG. 9 through the growth or diminution of dendrite surface areas due to the formation of metallic "whiskers" on the dendrite.

In the case of dendritic growths the surface area and conductances are roughly proportional to the mass and also the mass change upon deposition is proportional to charge transfer. Therefore, the conductance change is roughly proportional to charge transfer $$\Delta C_d = K\Delta Q \quad (5)$$

or $$(dC_d/dt) = (\pm)KI \text{ where } I = dQ/dt \quad (6)$$

Then $$(dC_d/dt) = K(\pm)(\pm)(e,\ 0)[C_d] = K(e,0)[C_d] \quad (7)$$

hence, all conductivity weights $C_{d_i}$ increase with use (both excitatory and inhibitory!).

The capability of furnishing a flexible or plastic linear decision function is a major importance in pattern recognition systems.

With the presence of metallic ions in the electrolyte and field electrode it is possible to induce selective growth of various dendrites in such a way as to alter the conductance of the dipoles and therefore alter the response function or behavior of the device to any member of the general class of linear decision functions.

If an E.M.F. E is applied by the source 151 across the field electrodes 143 and 144 shortly after a set of input electrodes (excitors or inhibitors) has fired, the current through the unused elements will be negligible. For those inputs recently fired $$I_i \approx E[C_d]_i \quad (8)$$

and therefore $$(dC_{d_i}/dt) = \pm KE[C_d]_i \quad (9)$$

That is, the weight (i.e. conductivity) of those recently fired inputs which are positive will be increased, while those which are negative (inhibitory) will be decreased (in magnitude); the exact rate being somewhat dependent on the original weight. With a reversed field, produced by reversing switch 150, exactly the opposite will occur.

Analysis of similar types of conditioning processes applied to conventional electronic circuits, and equally applicable here, shows that they converge for many important learning tasks. See: B. Widrow, "Generalization and Information Storage in Networks of Adaline Neurons"; von Foerster, H., ed., University of Illinois Symposium on Self-Organization, Pergammon Press (1962).

If it is desired that one input be potentially capable of attaining either positive or negative net weight, it is merely necessary to provide both excitatory and inhibitory elements for each source.

It should be again noted that in the embodiment of FIG. 9 the barrier to return currents along the exterior of each individual dipole comprises either an array of dielectric balls of varying sizes or a continuous wall or membrane. The electrolyte, in the usual case concentrated nitric acid between 50% and 70%, exhibits a conductivity in the range of 0.3 to 0.6 (ohm-cm.)$^{-1}$ which is very much greater than the conductivity of the excitable material (iron) with a passivated surface film measured in a direction transverse to the passivated surface as long as the distance involved is a few centimeters or less. The bulk conductivity of the electrolyte is decreased by the inclusion of dielectric bodies, such as glass balls, and by the selection of a mixture of a number of sizes of dielectric bodies the bulk conductivity of the mass may be precisely controlled to within a selected range. For example, the bulk conductivity of nitric acid can be reduced with the addition of different mixtures of sizes of small glass spheres without altering the electrolyte composition and, hence, surface chemistry and kinetics.

A dielectric filler mixture, for example 1 mm. and $1/10$ mm. diameter glass balls (72% and 28%, respectively, by weight) reduces the bulk conductivity of the electrolyte by approximately a factor of 10 whereupon the resistance of the return path between excitable and inexcitable portions of a single dipole is sufficiently high that coupling between inexcitable portions of excited dipoles occurs. An advantage in the use of discrete dielectric members rather than continuous barriers is that a multiple logic element may be produced, employing: a large number of dipoles similar in shape or of different sizes and shapes, a predetermined mixture of dielectric particles, and, an electrolyte, all sealed within a chamber with only peripheral access by probes. The arrangement of the dipoles and dielectric particles need not be precisely controlled to obtain a logic element capable of producing numerous useful stimulus-response combinations.

It is to be understood that the above described embodiments are merely illustrative of the application of the principles of my invention. Numerous other embodiments may be devised by one skilled in the art without departing from the spirit of this invention. The monopoly granted hereby shall not be limited to the embodiments shown but rather by the scope of the following claims:

What is claimed is:

1. An electrochemical logic element comprising a housing:

a fluid reactive electrolyte in said housing;

a first metallic electrode disposed in said electrolyte including a first portion chemically reactive with the electrolyte for forming a passivated unstable poorly conducting coating on the surface thereof and a second portion substantially inactive chemically with said electrolyte;

a second metallic electrode disposed in said electrolyte including a first portion chemically reactive with the electrolyte for forming a passivated unstable poorly conducting coating on the surface thereof and a second portion substantially inactive chemically with said electrolyte;

said electrodes immersed in said fluid reactive electrolyte;

means in said electrolyte for decreasing the bulk conductivity of the electrolyte in the region between the first and second portion of said electrodes;

means for locally disturbing a portion of the passivated unstable coating on said first electrode; and means for detecting a change in the condition of the passivated unstable coating on said second electrode in response to the disturbance of said first electrode.

2. An electrochemical logic element comprising:

a first dipole including a first portion having the property of forming a passivated unstable poorly conducting film on the surface thereof in the presence of a reactive electrolyte and a second portion electrically conductive and in conductive contact with said first portion, said second portion substantially inactive chemically in the presence of such a reactive electrolyte;

a second dipole including a first portion having the property of forming a passivated unstable poorly conducting film on the surface thereof in the presence of a reactive electrolyte and a second portion electrically conductive and in conductive contact with said first portion, said second portion substantially inactive chemically in the presence of such a reaction electrolyte;

a housing;

means positioning said dipoles within said housing, said positioning means providing a poorly conducting path for electrical current between the first and second portions of each of the dipoles;

a reactive electrolyte in said housing in intimate contact with said first and second dipoles;

means for locally disturbing the passivated unstable film formed on said first dipole; and means for detecting a change in the condition of the passivated unstable coating on said second dipole in response to the disturbance of said first dipole.

3. An electrochemical logic element comprising:

a first dipole including a first portion having the property of forming a passivated unstable poorly conducting film on the surface thereof in the presence of a reactive electrolyte and a second portion electrically conductive and in conductive contact with said first portion, said second portion substantially inactive chemically in the presence of such a reactive electrolyte;

a second dipole including a first portion having the property of forming a passivated unstable poorly conducting film on the surface thereof in the presence of a reactive electrolyte and a second portion electrically conductive and in conductive contact with said first portion, said second portion substantially inactive chemically in the presence of such a reactive electrolyte;

a housing;

means positioning said dipoles in generally aligned parallel relationship within said housing, said positioning means constituting a poorly conducting barrier between the first and second portions of said dipoles;

a reactive electrolyte in said housing in intimate contact with said first and second dipoles;

means for locally disturbing a portion of the passivated unstable film on said first dipole; and means for detecting a change in the condition of the passivated unstable film on said second dipole in response to the disturbance of said first dipole.

4. The combination in accordance with claim 3 wherein said disturbing means comprises an electric probe for applying an electric field into the region adjacent to the passivated unstable film on said first dipole.

5. The combination in accordance with claim 3 wherein said detecting means comprises an electric probe for detecting the presence of a local electric field in the region adjacent to the passivated unstable film on said second dipole.

6. An electrochemical logic element comprising:

a first dipole including a first portion having the property of forming a passivated unstable poorly conducting film on the surface thereof in the presence of a reactive electrolyte and a second portion electrically conductive and in conductive contact with said first portion, said second portion substantially inactive chemically in the presence of such a reactive electrolyte;

a second dipole including a first portion having the property of forming a passivated unstable poorly conducting film on the surface thereof in the presence of a reactive electrolyte and a second portion electrically conductive and in conductive contact with said first portion, said second portion substantially inactive chemically in the presence of such a reactive electrolyte;

a housing;

means positioning said first and second dipoles in generally parallel aligned relationship within said housing;

a reactive electrolyte in said housing in intimate contact with said first and second dipoles;

said positioning means comprising a poorly conducting continuous membrane serving to effectively isolate the conduction path through the electrolyte between the first portions and second portions of said dipoles;

means for locally disturbing a portion of the passivated unstable film along said first dipole; and means for detecting a change in the condition of the passivated unstable film on said second dipole in response to the disturbance of said first dipole.

7. The combination in accordance with claim 6 wherein said reactive electrolyte exhibits high conductivity and said disturbing means comprises an electric probe for applying a film destroying potential to the electrolyte in the region of the passivated unstable film on said first dipole whereupon the potential applied across the film of said second dipole through coupling between the second portions of said first and second dipoles tends to disrupt the passivated film on said second dipole and produce localized current between the first portion of said second dipole and the surrounding electrolyte.

8. The combination in accordance with claim 7 wherein said detecting means comprises probe means for detecting a change in the local electric field in the region of the first portion of said second dipole resulting from the disruption of the passivated film thereon.

9. An electrochemical logic element comprising:

a first dipole including a first portion of substantially pure iron and a second portion of a noble metal, said first and second portions in conductive contact;

a second dipole including a first portion of substantially pure iron and a second portion of a noble metal, said first and second portions in conductive contact;

a housing;

means positioning said first and second dipoles in said housing and constituting a poorly conducting barrier between the noble metal and iron portions of said dipoles;

said housing filled with nitric acid of a concentration between 50% and 70% in intimate contact with the surface of said first and second dipoles;

said nitric acid reacting the iron portions of said first and second dipoles to produce passivated unstable surface films thereon;

means for locally disturbing the passivated film on the iron portion of said first dipole; and means for detecting a change in condition of the passivated unstable film on the iron portion of said second dipole in response to disturbance of said first dipole.

10. The combination in accordance with claim 9 wherein said disturbing means comprises electric probe for applying a positive potential in the region of the passivated unstable film on said first dipole.

11. The combination in accordance with claim 9 wherein said detecting means comprises electric probe in the region of the passivated unstable film on said second dipole detecting an electric field change resultant from the disturbance of the passivated unstable film on said second dipole.

12. The combination in accordance with claim 9 wherein said positioning means comprises a continuous dielectric membrane extending across said housing and electrically insulating the major portion of the noble metal portion of said dipoles from the iron portions thereof.

13. A three-terminal logic element comprising three dipoles, each including a first electrically conducting portion having the property of forming an unstable passivated film on the surface thereof in the presence of a reactive electrolyte, and a second electrically conducting portion substantially inactive chemically with such a reactive electrolyte, each of said dipoles having the first and second portions thereof in electrically conducting contact;

a housing;

means positioning said dipoles in said housing and forming a poorly conducting barrier between the first and second portions of said dipoles;

an electrolyte in said housing in intimate contact with the first and second portions of said dipoles;

means for selectively disturbing the passivated film formed on the surface of the first portion of said first dipole by reaction with said electrolyte;

means for selectively disturbing the passivated film on the surface of the first portion of said second dipole formed by reaction with electrolyte; and means for detecting a change in condition of the passivated film formed on the third of said dipoles resultant from the simultaneous coupling of energy from both said first and second dipole to the third dipole.

14. The combination in accordance with claim 13 wherein said dipoles are arranged in generally parallel alignment for conductive coupling between the inexcitable portions of the first and second dipoles through the electrolyte to the inexcitable portion of the third dipole.

15. The combination in accordance with claim 14 wherein the mass of inexcitable portions of said first and second dipoles is insufficient to provide effective coupling singly to the inexcitable portion of the third dipole whereby the logic element provides a response only upon the simultaneous excitation of the first and second dipoles and thereby providing coincidence gate operation.

16. The combination in accordance with claim 14 wherein the inexcitable portions of the first and second dipoles are of sufficient mass to singly provide sufficient conductive coupling to the inexcitable portion of the third dipole, on the excitation of either the first or second dipole, to result in excitation of the third dipole and OR gate operation is thereby provided.

17. A three-terminal electrochemical logic element comprising three dipoles, each including a first electrically conducting portion exhibiting the property of forming passivated unstable poorly conducting surface film thereon in the presence of a reactive electrolyte and a second conductive portion substantially inactive chemically with such a reactive electrolyte;

a housing;

an electrolyte contained within the housing in intimate contact with said dipoles and reactive therewith;

means positioning the three dipoles within said housing and substantially isolating the first portion and the second portion of each of the dipoles, two of the dipoles relatively aligned in parallel alignment whereby a conductive path through the electrolyte in said housing exists between inexcitable portions of a first and third dipoles, the second dipole oriented such that a conductive path through the electrolyte exists between the first portion of one dipole and the second portion of the second dipole;

means for selectively disturbing the passivated surface film on the first portion of the first and second dipoles; and means for detecting a disturbance on the surface passivated film on the third dipole.

18. The combination in accordance with claim 17 wherein the first portion of said dipoles comprises substantially pure iron, the second portion of said dipoles comprises a noble metal, and the electrolyte comprises nitric acid between 50% and 70% concentration.

19. The combination in accordance with claim 17 wherein said positioning means comprises continuous dielectric barrier separating the first and second portions of the respective dipoles.

20. The combination in accordance with claim 17 wherein said positioning means comprises a number of poorly conductive discrete elements positioned in closely backed arrangement within said housing to constitute support for said dipoles and reducing the bulk conductivity of the electrolyte in the housing.

21. The combination in accordance with claim 20 wherein said positioning means comprises a mixture of sizes of dielectric balls.

22. An electrochemical logic element comprising a first array of three dipoles, each including a first portion constituting a mass of electrically conducting material exhibiting the property of forming a passivated unstable poorly conducting surface film in the presence of a reactive electrolyte and a second portion of electrically conductive material exhibiting good bulk and surface conductivity in the presence of such a reactive electrolyte;

a second array of three dipoles including a first portion constituting a mass of electrically conducting material exhibiting the property of forming a passivated unstable poorly conducting surface film in the presence of a reactive electrolyte and a second portion of electrically conductive material exhibiting good bulk and surface conductivity in the presence of such a reactive electrolyte;

a housing;

poorly conducting means for positioning said first and second arrays of dipoles with the first and second portions of each respective dipole in relatively isolated position with respect to each other and two of the three dipoles of each array in generally parallel side-by-side alignment and the third dipole of each of said arrays in opposite alignment;

a reactive electrolyte in said housing in intimate contact with the first and second portions of all of said dipoles;

signal source means for disturbing the passivated unstable film on a pair of oppositely disposed dipoles of said first array;

means responsive to the disturbance of the passivated film on the third dipole of said first array for disturbing the passivated unstable film on one of the dipoles of said second array; and signal source means for disturbing the passivated unstable film on the second dipole of said second array and means for detecting the disturbance of the passivated unstable film on the third dipole of said second array.

23. The combination in accordance with claim 22 wherein the signal source means operatively connected to disturb the passivated unstable film on one of the dipoles of said first array comprises a source of constant excitation.

24. The combination in accordance with claim 23 wherein said source of constant excitation is operatively connected to disturb the passivated unstable film on one of said parallel aligned dipoles of said first array constituting an input diode.

25. The combination in accordance with claim 22 wherein said means responsive to the disturbance of the passivated unstable film on the third dipole of said first array comprises a length of material exhibiting the property of forming a passivated unstable poorly conducting surface film in the presence of the reactive electrolyte and of propagating a disturbance over the surface thereof.

26. The combination in accordance with claim 23 wherein the first array of dipoles responds in the absence of a signal at the oppositely aligned dipole to produce a complement function.

27. The combination in accordance with claim 24 wherein a signal source for the second dipole array is operatively connected to one of the aligned similarly oriented dipoles and the film disturbing means responding to the first array is operatively connected with the oppositely oriented dipole of said second array whereby a logic element produces a response on the third dipole of said second array upon the coincident operation of said signal sources.

28. An exclusive OR gate comprising a pair of dipoles each including a first portion constituting a mass of electrically conducting material exhibiting the property of forming a passivated unstable poorly conducting surface film in the presence of a reactive electrolyte and a second portion of electrically conductive material exhibiting good bulk and surface conductivity in the presence of such a reactive electrolyte;

a housing;

a reactive electrolyte within said housing in intimate contact with the first and second portions of said dipoles;

poorly conducting means within said housing positioning said dipoles in side-by-side opposite alignment and constituting a barrier to conduction currents through said electrolyte between the first and second portions of the respective dipoles;

signal means for disturbing the passivated unstable film on the first portions of said dipoles;

output means in contact with the electrolyte in the housing including a pair of first and second portions aligned with respective first and second portions of said dipoles in which the first portion constitutes a mass of electrically conductive material exhibiting the property of forming a passivated unstable poorly conducting surface film in the presence of a reactive electrolyte and a second portion which constitutes an electrically conductive material exhibiting good bulk and surface conductivity in the presence of such a reactive electrolyte; and said output means responding to the disturbance of either of said pair of dipoles to produce an output pulse and in the presence of simultaneous disturbance of the passivated film on both of said dipoles to produce equal but opposite fields across the barrier and to constitute effective low resistance return paths for currents through said dipoles.

29. An adaptive electrochemical logic element comprising plurality of dipoles each comprising a first portion having the property of forming a passivated unstable poorly conducting film on the surface thereof in the presence of a reactive electrolyte and a second portion electrically conductive and substantially inactive chemically with such an electrolyte;

housing;

means for positioning said dipoles within said housing with at least two dipoles in relatively aligned side-by-side relationship and a third dipole in opposite alignment;

a fluid medium contained within said housing in intimate contact with said dipoles;

said fluid medium comprising a reactive electrolyte component and a metallic ion containing component;

barrier means for reducing the bulk conductivity of said fluid medium between the first and second portions of said dipoles;

means for disrupting the unstable passivated film on the first portion of selected dipoles;

means for detecting changes in the passivated unstable film on another of said dipoles responsive to the disruption of the film on the selected dipoles; and means for applying an electric field across spaced regions of said fluid to vary the response of the logic element.

30. The combination in accordance with claim 29 wherein said field applying means constitutes a pair of dipoles positioned to apply a current inducing field in a direction generally parallel to the direction of alignment of said dipoles.

31. The combination in accordance with claim 29 including means for reversing the direction of the electric field applied across the region of said fluid to selectively increase or decrease the conductivity of the second portions of said dipoles by the growth or diminution of metallic formations thereon.

32. The combination in accordance with claim 29 wherein said barrier means comprises a substantially continuous dielectric membrane effectively preventing conduction of current through said fluid medium between first and second portions of respective dipoles.

33. The combination in accordance with claim 29 wherein said positioning and barrier means comprise an array of particulate dielectric bodies within said housing supporting said dipoles.

34. The combination in accordance with claim 33 wherein said dielectric bodies comprise a mixture of different sizes of glass balls.

35. A linear decision function generating assembly comprising a plurality of excitor dipoles, at least one inhibitor dipole, a single responsor dipole, all of said dipoles including a first portion having the property of forming a passivated unstable poorly conducting film on the surface thereof in the presence of a reactive electrolyte and a second portion electrically conductive and substantially inactive chemically with such an electrolyte, the excitor dipoles constituting such elements substantially in parallel alignment and oriented with the responsor dipole, said inhibitor dipole constituting such elements substantially in alignment and oppositely oriented with respect to said responsor dipole;

a housing;

poorly conducting means positioning said dipoles within said housing;

a reactive electrolyte within said housing in intimate contact with said dipole;

said positioning means effectively isolating the first and second portions of each dipole from current conduction paths through the electrolyte; and means for simultaneously disturbing the passivated film on the first portions of selected excitor and inhibitor dipoles and means for detecting a change in the passivated film on said responsor dipole in response to such input disturbing stimuli to the excitor and inhibitor dipoles.

No references cited.

JOHN W. HUCKERT, *Primary Examiner.*

J. D. KALLAM, *Assistant Examiner.*